(12) United States Patent
Miskovic et al.

(10) Patent No.: US 12,298,937 B2
(45) Date of Patent: *May 13, 2025

(54) NETWORK ACTIVITY IDENTIFICATION AND CHARACTERIZATION BASED ON CHARACTERISTIC ACTIVE DIRECTORY (AD) EVENT SEGMENTS

(71) Applicant: Splunk Inc., San Francisco, CA (US)

(72) Inventors: Stanislav Miskovic, San Francisco, CA (US); Satheesh Kumar Joseph Durairaj, San Francisco, CA (US); George Apostolopulous, San Francisco, CA (US); Dimitrios Terzis, San Francisco, CA (US)

(73) Assignee: SPLUNK Inc., San Francisco, CA (US)

( * ) Notice: Subject to any disclaimer, the term of this patent is extended or adjusted under 35 U.S.C. 154(b) by 982 days.

This patent is subject to a terminal disclaimer.

(21) Appl. No.: 17/212,399

(22) Filed: Mar. 25, 2021

(65) Prior Publication Data

US 2021/0209067 A1    Jul. 8, 2021

Related U.S. Application Data

(63) Continuation of application No. 15/478,186, filed on Apr. 3, 2017, now Pat. No. 11,010,342.

(51) Int. Cl.
*G06F 16/17* (2019.01)
*G06N 5/025* (2023.01)
(Continued)

(52) U.S. Cl.
CPC ......... *G06F 16/1734* (2019.01); *G06N 5/025* (2013.01); *G06N 5/047* (2013.01); *G06N 20/00* (2019.01); *H04L 67/535* (2022.05)

(58) Field of Classification Search
CPC .... G06F 16/1734; G06N 5/025; G06N 5/047; G06N 20/00; H01L 67/535; H01L 24/81
See application file for complete search history.

(56) References Cited

U.S. PATENT DOCUMENTS

7,908,657 B1 * 3/2011 Hernacki .............. G06F 21/564
714/33
9,306,962 B1 4/2016 Pinto
(Continued)

*Primary Examiner* — Christopher C Harris
(74) *Attorney, Agent, or Firm* — Kilpatrick Townsend & Stockton LLP (57) ABSTRACT

A system and method of obtaining and utilizing an activity signature that is representative of a specific category of network activities based on directory service (DS) log data. The activity signature may be determining by a learning process, including segmenting and pruning a training dataset into a plurality of event segments and matching them with activities based on DS log data of known activities. Once obtained, the activity signature can advantageously be utilized to analyze any DS log data and activities in actual deployment. Using activity signatures to analyze DS event log can reveal roles of event-collection machines, aggregate information dispersed across their component events to reveal actors involved in particular AD activities, augment visibility of DS by enabling various vantage points to better infer activities at other domain machines, and reveal macro activities so that logged information becomes easily interpretable to human analysts.

20 Claims, 8 Drawing Sheets

(51) Int. Cl.
*G06N 5/047* (2023.01)
*G06N 20/00* (2019.01)
*H04L 67/50* (2022.01)

(56) References Cited

U.S. PATENT DOCUMENTS

| | | | |
|---|---|---|---|
| 9,483,579 | B2 | 11/2016 | Marquess et al. |
| 9,626,414 | B2 * | 4/2017 | Kanjirathinkal .. G06F 16/24578 |
| 9,866,426 | B2 * | 1/2018 | Shelton ............... H04L 41/0631 |
| 10,015,177 | B2 | 7/2018 | Muddu et al. |
| 2003/0188189 | A1 | 10/2003 | Desai et al. |
| 2005/0235356 | A1 * | 10/2005 | Wang .................. G06F 16/2477 726/22 |
| 2007/0171923 | A1 | 7/2007 | Eisner et al. |
| 2008/0022209 | A1 | 1/2008 | Lyle |
| 2011/0138468 | A1 | 6/2011 | Chaudhry et al. |
| 2012/0246303 | A1 * | 9/2012 | Petersen ............ G06F 16/1734 709/224 |
| 2014/0236889 | A1 | 8/2014 | Vasan et al. |
| 2015/0213358 | A1 * | 7/2015 | Shelton ............... H04L 41/0636 706/47 |
| 2015/0293920 | A1 | 10/2015 | Kanjirathinkal et al. |
| 2015/0319234 | A1 | 11/2015 | Wang et al. |
| 2015/0347523 | A1 | 12/2015 | Patel et al. |
| 2017/0214708 | A1 | 7/2017 | Gukal et al. |
| 2017/0220256 | A1 | 8/2017 | Balasubramonian et al. |
| 2018/0075513 | A1 | 3/2018 | Bastide et al. |
| 2018/0095782 | A1 | 4/2018 | Driever et al. |
| 2018/0183829 | A1 * | 6/2018 | Ward ...................... H04L 67/01 |
| 2018/0248902 | A1 * | 8/2018 | Dănilă-Dumitrescu .................... H04L 67/535 |

\* cited by examiner

NETWORK ACTIVITY IDENTIFICATION AND CHARACTERIZATION BASED ON CHARACTERISTIC ACTIVE DIRECTORY (AD) EVENT SEGMENTS

REFERENCE TO RELATED U.S. APPLICATION

This application is a continuation of U.S. application Ser. No. 15/478,186, titled "Network Activity Identification and Characterization Based on Characteristic Active Directory (Ad) Event Segments," filed on Apr. 3, 2017, which is incorporated by reference in its entirety.

BACKGROUND OF THE INVENTION

In general, an Active Directory (or AD) is a network directory service that provides a broad range of directory-based identity-related services, including recording information about user, computer and service accounts in an AD domain network.

With regard to each network activity in an AD domain, an AD domain controller collects and records pertinent information in the form of multiple well-defined AD events, such as the information related to a logger machine ID, a user ID, logon attempts made during the authentication of a user, data access events, execution operations on a server, logoff events, etc. This sort of information is useful for providing insight in diagnosing performance problems, detecting and investigating security breaches, monitoring user interactions, profiling users, ensuring quality of services, etc.

Part of the AD's role is authentication and authorization, which makes the AD the target of many types of attacks intent on rogue access to various business resources. Various defensive mechanisms have matured over time and have been implemented in the AD's design, but disproportionally little has been done to enable security analysis of the AD's operation in real deployments. The state-of-the-art approaches to such analysis are heavily reliant on "trial and error," resulting in costly, erroneous investigations and often based on inconclusive findings by security professionals.

The key challenges to making effective use of the AD log data are imposed by limited visibility or clarity that are inherent to the AD's event reporting. The origins of these challenges are diverse, including some events not being reported to/at specific vantage points (AD systems/computers) by design, or events not disclosing some critical information also by design, or event parameters being ambiguous, or events being reported for an a priori unknown number of times. These outlined problems result in blind spots, effectively hiding users, machines or activities that may be a part of a security incident. Even if incidents are detected under blind spots, these problems can cause incorrect incident attribution or overrepresentation of security-sensitive activities.

Further, the lack of clarity can largely be attributed to the fact that AD events are designed to describe fine-grained activities, e.g., interactions between AD Objects and Security Principles. At this level of granularity, it is often impossible to comprehend a big picture of activities, such as actual malicious activities, happening in AD domains. It is also rarely possible to understand the roles of machines that reported events (roles being: source of the activity, destination of the activity, and a domain controller machine).

Current state-of-the-art in AD security analysis focuses on tracking per-event or even per-event-parameter phenomena. Moreover, state-of-the-art analysis relies on information coming from various sources. For example whenever a feasible event or parameter is discovered, it can be tracked and used as an indicator of a particular type of exploit. Therefore, it is usually very difficult to make effective use of AD log data to characterize, and even observe, activities like logins (including direct logins, remote desktop protocol (RDP) logins), remote command executions, shared access, and so on.

Particularly with respect to characterization of login activities in an AD, the challenges include lack of information (inherent to event logging design) and AD's flaws in reporting true user identities. The visibility problems generally originate from discrepancies in the types of events logged at sources, destinations and domain controllers, specific authentication protocols offering only a disparate amount of login information, and generally accepted practices of analyzing logs on a per-event basis.

Additional challenges arise due to certain events reporting inconclusive information about actors in a given user/machine activity. It is often the case that event parameters are equally likely to point to destinations or sources of login activity. In some cases, such confusion is caused by lacking a priori information about the roles of event-reporting machines.

Moreover, in some activities, AD login procedure reports may completely invert reporting of source and destination user accounts depending on the roles of these accounts in the domain. Specifically, when a source user has domain administrative privileges, while a destination user is local to the destination machine, the login process at the destination would designate the source user as performing most activities. In those same events, the situation would completely change, and a destination user would be the one reported as doing most activities in a setting where a source user is local and the destination user has domain-administrative privileges. Therefore, by observing the same set of events in such login procedures, one cannot tell roles of the reported users a priori.

For example, incorrect attack attribution is a common practical problem in interpreting AD event logs. Possibilities for incorrect attack attribution are numerous in AD logging when only specific event IDs are observed or when events are observed in isolation. The simplest example is observing events with ID 4624 (an account was successfully logged on) when they report Kerberos authentications. The Network Information section of these events is ambiguous, such that its meaning depends on where the event was reported. This opens possibilities for misattribution. Specifically, if 4624 events are reported by domain controllers, the Network Information section points to a destination machine, while if the events are reported by a destination machine, the same section points to a source machine. Using the conventional approach, it is impossible to determine which machine reported the event. Consequently, an attack that was happening at the destination machine could easily be falsely attributed as if it was happening on a source machine. Similar problems can occur with Kerberos ticketing events (IDs 4768 and 4769) whose network information is equally ambiguous, but ambiguities are imposed by how these events are sequenced in time.

Another common problem is over-representation of security sensitive activities. The simplest example of security-sensitive events being exaggerated is the basic statistic of login counting or login duration assessment. Currently, it is believed that a login activity is represented by a single 4624 event—which is not unusual given that the name of that event is "an account was successfully logged on." However, in reality most logon activities are represented by several 4624 events: First, there is a domain authentication part represented by one or more 4624 events. Then, to complete a login activity, a user must pass local authentication which adds more 4624 events. Finally, during activities following a login, the user may be re-authenticated adding yet more 4624 events. Consequently, by current analytical standards, it would very be falsely diagnosed that a user logged in many times and that durations of such logins were mostly short which may indicate a security risk, while the user had only a single login activity in reality.

SUMMARY OF THE INVENTION

Accordingly, disclosed herein is a mechanism of efficiently analyzing directory service (DS) log data which enables identification and characterization of high-level network activities reported therein, thereby overcoming visibility and other reporting limitations in a directory service.

Embodiments of the present disclosure exploit an activity signature that is representative of a specific category (or type) of network activities, particularly the network activities corresponding to high-level activities or macro-activities. Such an activity signature can be predetermined and generic with respect to a wide range of operational networks, and thus advantageously be utilized to analyze DS log data in actual deployment, despite the visibility and ambiguity issues as previously explained. Activity signatures can be used as macro signatures of activities, and extrapolate a representation of information offered by individual events into a representation corresponding to activities which are understandable to human analysts, such as log on activities or attacker activities.

When applied to analyze a DS event log, activity signatures according to the present disclosure can advantageously reveal roles (e.g., source, destination and domain controller) of event-collection machines. Such roles are otherwise largely indistinguishable via observations of event logs or individual logged events.

Further, activity signatures can advantageously aggregate information dispersed across their component events to reveal all or most actors (machines, users or services) involved in particular AD activities which entities can otherwise be blurred in individual AD events.

Still further, activity signatures can advantageously improve visibility of the AD by enabling various vantage points (such as domain controllers) to better infer activities at other machines in the domain.

Still further, activity signatures can advantageously reveal macro activities by extrapolating fine-grained AD operations, such that logged AD information becomes easily interpretable to human analysts.

An activity signature may be in a form of a characteristic event segment or referred as a "grouplet" herein. Each characteristic event segment includes one or more DS events, e.g., AD events. In some embodiments, a grouplet can be determined by using a training (or learning) process, for example, an offline training process.

In a training process, the DS log data resulting from network activities in an actual operational network is accessed and segmented into candidate event segments based on specific event parameters and selected event attributes. The candidate event segments are then pruned to discover common events across similar candidate event segments, for example by using sequential pattern mining and association rule learning processes. Thus, each pruned event segment corresponds to a single common event or a set of common events which may include a subset of sequential events and a subset of unordered events. To identify the respective categories of activities associated with the pruned event segments, the DS events resulting from known activities are compared with the pruned event segments through a matching process. The known activities may be executed in a controlled execution platform. As a result, a grouplet is associated with a category of activities and indicated as an activity signature thereof. Once they are determined, grouplets can be applied in various ways to any collection or live reports of AD events in real time.

More specifically, according to one embodiment of the present disclosure, a method of obtaining an activity signature includes: accessing a collection of DS events resulting from recorded network activities in an operational network; segmenting the collection of DS events into candidate event segments; pruning the candidate event segments; identifying a matching event segment by comparing the pruned event segments with a first set of DS events that result from a known network activity of a first category; and assigning the matching event segment as an activity signature representative of network activities of the first category. The collection of DS events and the first set of DS events may be AD events.

In one embodiment, the method may further include initiating the known network activity in a controlled execution platform that is external to the operational network.

The above-described segmenting the collection of DS events may include: selecting seed events and termination events based on the first category from the collection of DS events; selecting events from the collection of DS events based on event parameters and event attributes; and assigning selected events in a same candidate event segment with the seed events and the termination events.

The above-described pruning the candidate event segments may include identifying common events in a set of similar candidate event segments.

The above-described identifying the matching event segment may include using a matching process to determine similarities between the first set of DS events and the pruned event segments.

The activity signature may include event information indicative of an activity timespan, activity actors, attributes of activity actors, respective privileges of the activity actors and resources involved in an activity. The activity signature may be specific to a role of an event reporting machine, wherein the role of the event reporting machine is one of: a source machine, a destination machine, and a domain controller.

Embodiments of the present disclosure are also directed to a computer system and a computer readable medium embodying the above described method.

BRIEF DESCRIPTION OF THE DRAWINGS

Embodiments of the present invention will be better understood from a reading of the following detailed description, taken in conjunction with the accompanying drawing figures in which like reference characters designate like elements.

DETAILED DESCRIPTION

Reference will now be made in detail to various embodiments of the present disclosure, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Network Activity Identification and Characterization Based on Characteristic Active Directory (Ad) Event Segments Overall, embodiments of the present disclosure provide a system and a method of analyzing directory service log data to identify and characterize network activities at a customized level by using activity signatures. In some embodiments, activity signatures may be in the form of event grouplets (or characteristic event segment herein). A grouplet according to the present disclosure is set of one or more events correlated over time or over directory service systems/computers in a way in which they become representative of macro activities happening in directory service domains. As opposed to individual events reported by the directory service log data, such macro activities represented by the grouplets can be advantageously customized at a level that is readily understandable to a human analyst as well as to various existing analysis tools.

According to embodiments of the present disclosure, an offline correlation process is leveraged to learn and identify grouplets in datasets collected from actual deployments, as well as to use controlled lab environments to refine the learning or to properly initiate it.

Although embodiments of the present disclosure are described with respect to an Active Directory (AD) embodiment, it will be appreciated that the present disclosure may be applied to any other suitable directory service that is well known in the art.

Figure 1:
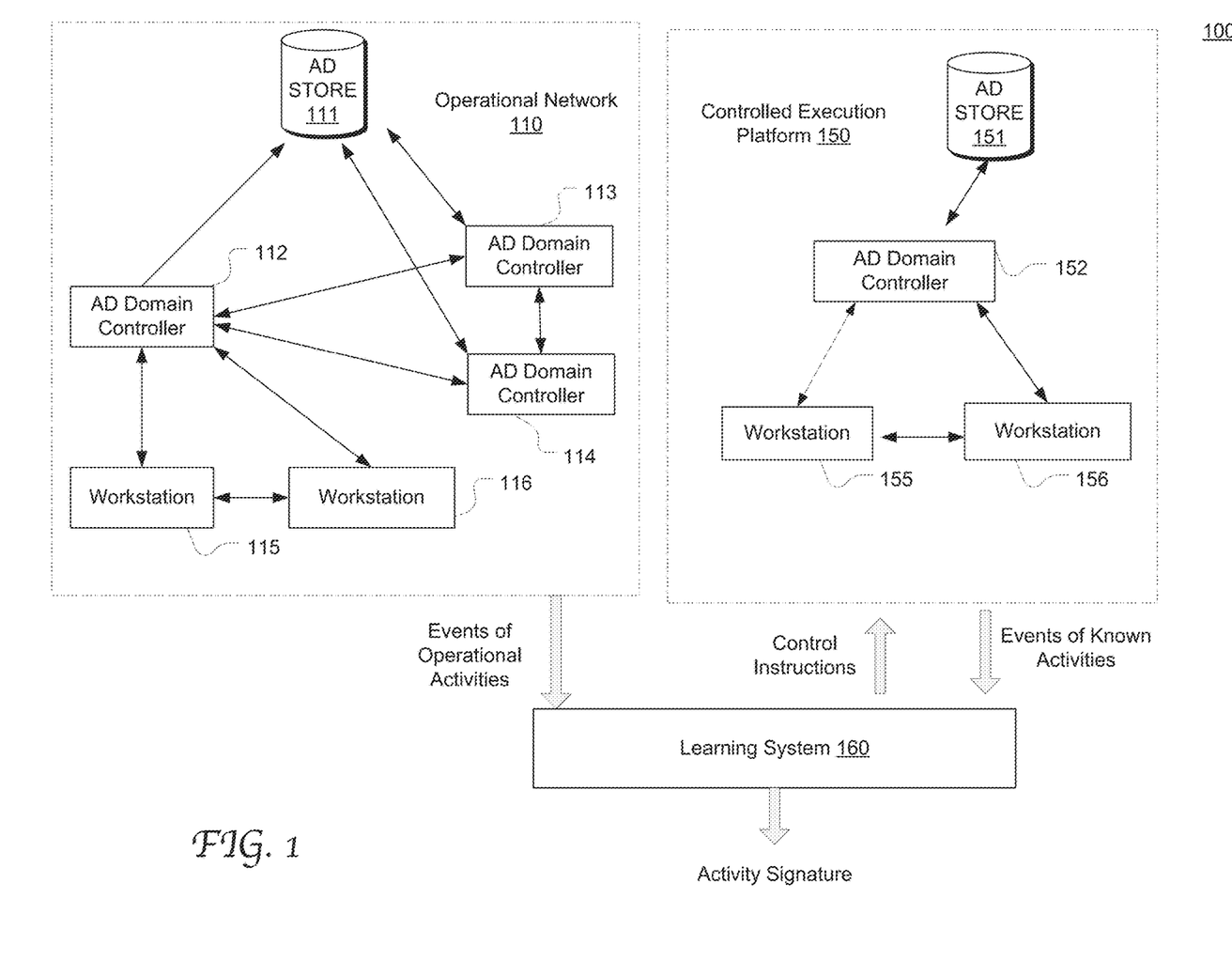
FIG. 1 illustrates the configuration of an exemplary training system configured to determine activity signatures of network activities based on AD event log data according to an embodiment of the present disclosure.

FIG. 1 illustrates the configuration of an exemplary training system 100 configured to determine activity signatures of network activities based on AD event log data according to an embodiment of the present disclosure. The training system 100 involves communication and data processing across an operational network 110, a controlled execution platform 150, and a learning system 160. It will be appreciated that the present disclosure is not limited to any specific configuration for the training system.

In this example, the operational network 110 may be a production network in actual deployment and configured as an AD domain, including the AD domain controllers 112-114, domain member machines acting as sources and destinations of activities (such as the workstations 115-116), the AD store 111, and a variety of many other network components that are well known in the art. By using the domain controllers 112-114, network activities on the operational network 110 are reported and recorded in the form of AD events. For event reporting, it suffices that at least a part of the interaction of an activity involves an AD domain entity. The AD store maintains an AD event log. The operational network 110 may provide and include any kinds of shared resources or services to authorized users and may have any type of network topology.

The controlled execution platform 150 is also configured as an AD domain and provides a platform for executing various predetermined (or known) network activities to mimic network activities of interest on an operational network, such as the operational network 110. The known network activities are similarly recorded as AD events. The infrastructure of the controlled execution platform 150 may be much simpler than the operational network 110, including the domain controller 152, at least two domain-member machines acting as a source and a destination of an activity (the workstations 155-156), and the AD store 151. The components in the controlled execution platform 150 may be physical devices interconnected in a lab network environment. In some other embodiments, they may be implemented as simulated devices in a virtual network environment.

As described in greater detail below, the learning system 160 is configured to perform an automated process to determine activity signatures based on the AD events of the recorded activities on the operational network 110 and the AD events of the known activities on the controlled execution platform 150.

In some embodiments, a known activity may be preprogrammed and initiated by the learning system 160. Alternatively, a known activity may be controlled by a user or an automated process independent of the learning system 160, or in any other suitable manner that is well known in the art. In still some other embodiments, a known activity may not be predetermined and the execution thereof may not be controlled; rather they may be performed in an operational network as long as its correspondence with the resulting AD events are known and can be treated as a priori determined.

Figure 2:
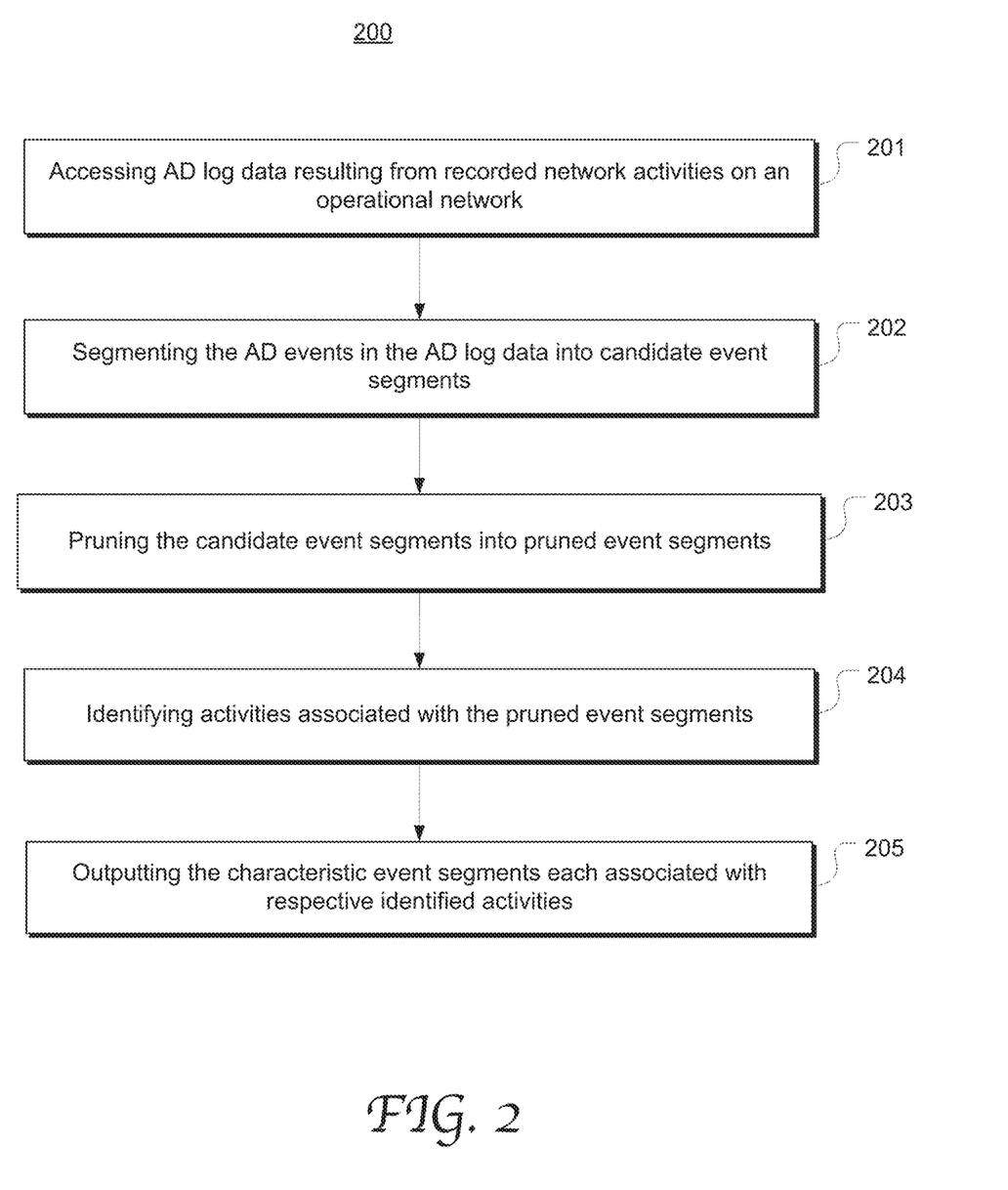
FIG. 2 is a flowchart depicting an exemplary computer-controlled process of determining a characteristic event segment as an activity signature according to an embodiment of the present disclosure.

The present disclosure is not limited to any specific combination of characteristic information contained in an activity signature, nor limited to any specific representation format or data structure of the characteristic information. FIG. 2 is a flowchart depicting an exemplary computer implemented process 200 of determining a characteristic event segment as an activity signature based on a training dataset according to an embodiment of the present disclosure. For example, process 200 may be performed by the learning system 160 and implemented as software logic executable on a computer.

At 201, the training dataset is accessed, including the AD log data of activities on an operational network (e.g., operational network 110 in FIG. 1) and AD log data of known activities (e.g., on a controlled execution platform).

At 202, the AD events in the AD log data are segmented into a plurality of candidate event segments. This segmentation process creates event collections which become candidates for activity-representative grouplets (or characteristic event segments). Each candidate event segment may correspond to a category of network activities at a prescribed level. A category of network activities may be macro-activities that are interpretable by human analysts, such as RDP logins, or remote execution of PowerShell commands, or listing users of an AD domain, etc.

Figure 7:
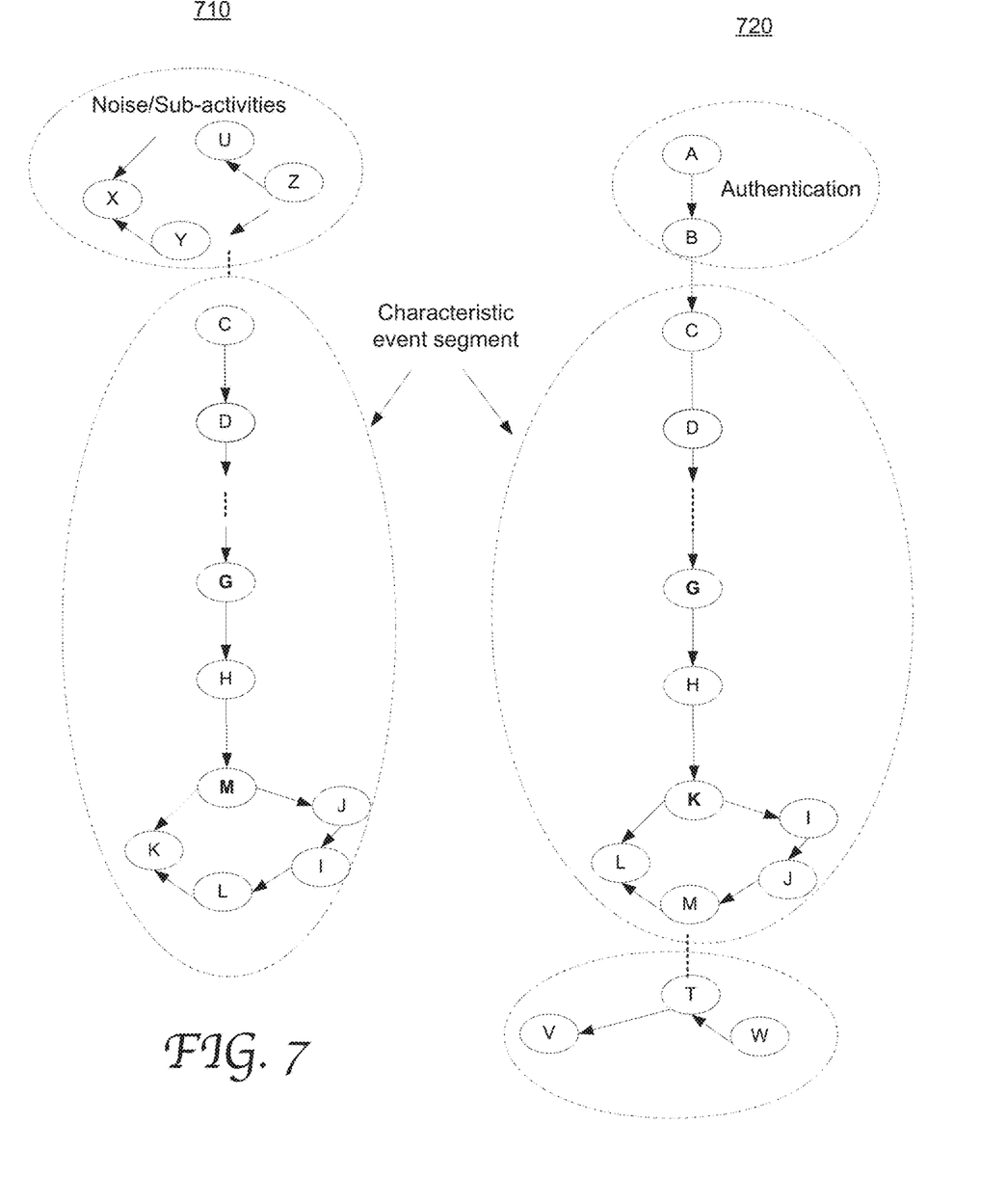
FIG. 7 illustrates the exemplary commonality and difference between the event sequence resulting from a known activity and a matching event segment according to an embodiment of the present disclosure.

There may be several differences between "raw" candidate event segments at this stage and finally learned grouplets, as shown in FIG. 7. First, the candidate event segments may be noisy. For example, the segments may contain events from other activities that by chance had similar users and machines (the two parameters based on which the segments are formed) in a specific segmentation instance. Next, candidate event segments may contain sub-activities that do not persistently occur in specific activities, thus being unsuitable for being included in grouplets. For example, such sub-activity may be an exchange of Kerberos tickets (event IDs 4768 and 4769), which would take place only if tickets are no longer valid. Finally, exact activities cannot be known yet for candidate segments (not a priori known), while such activities become known once grouplets are learned.

In this embodiment, the grouplets to be determined are consistently observed subsets of events inside the candidate event segments. Therefore, at 203, the candidate event segments are pruned to identify common events in a set of similar candidate event segments, for example, to identify a largest persistent collection of events appearing in them.

Generally, events in an event log exhibit two types of grouping behaviors. One behavior is events occurring in time ordered sequences. The other behavior is events occurring as collections without a specific time order. The goal of this pruning process is to identify common events across "similar" candidate event segments, irrespective of a grouping behavior. For identifying sequenced events, any sequential pattern mining algorithm or process can be applied such as the Generalized Sequential Pattern (GSP) algorithm or the PrefixSpan algorithm. For identifying events that occur as collections, any derivatives of an association rule learning process can be applied, such as the Frequent Pattern growth (FP-growth) algorithm.

At 204, the pruned event segments are associated with activities and thereby transformed to characteristic event segments. To recognize activities (or activity categories) described by the pruned event segments, the AD events of the known activities are leveraged and compared with the pruned event segments, for example by using a matching algorithm or process. Consequently, matched event segments are assigned to the corresponding activities, effectively becoming grouplets of these activities.

As a result, at 205, the grouplets each associated with respective activities are output, and may be used to as activity identifiers to analyze event logs of a wide range of other operational networks (particularly AD domain networks) which can be independent of the training system as shown in FIG. 1.

Figure 3:
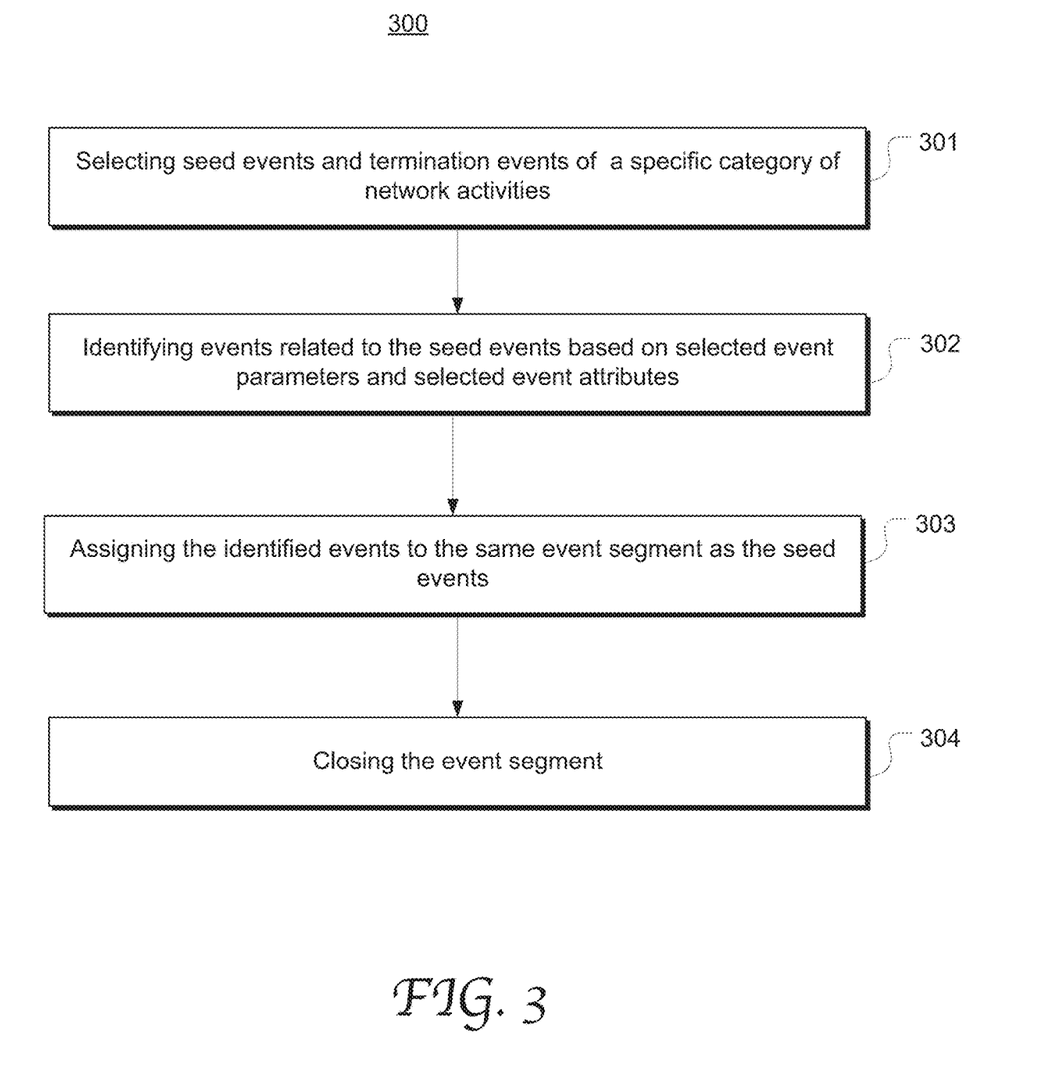
FIG. 3 is a flowchart depicting an exemplary computer-controlled process of event segmentation according to an embodiment of the present disclosure.

FIG. 3 is a flowchart depicting an exemplary computer implemented event segmentation process 300 according to an embodiment of the present disclosure. Process 300 corresponds to process 202 in FIG. 2. At 301, seed events and termination events are selected for a specific activity category. For example, a selection of seed and termination events may be based on the observation that most activities in an AD require permissions. The seed events can serve as indicators of separation between multiple activities a user may have in the AD (such as the activities of accessing AD shares, opening communication ports, executing commands on remote machines, etc.). Such separation enables learning grouplets that are strictly related to specific activities versus jointly reflecting many diverse activities.

For example, to access a security critical resource such as an AD share, a user usually has to first be authenticated/authorized to perform such activity. Thus, the primary choice of seed events are any events related to validation of permissions. For instance, event IDs of seed events are: 4624 (an account was successfully logged on), 4648 (a logon was attempted using explicit credentials), 4768 (a Kerberos authentication ticket (TGT) was requested), 4769 (a Kerberos service ticket was requested), 4776 (the computer attempted to validate the credentials for an account), 4672 (special privileges assigned to new logon), or 4964 (special groups have been assigned to a new logon). Accordingly, the counterparts of the seed events are selected as primary events for termination of event segments, e.g., in this case, event IDs 4634 (an account was logged off) or ID 4647 (user-initiated logoff) corresponding to the initial 4624 seed event.

In some cases, seed/termination events can be authentication events with negative outcomes. In these cases, activities cannot proceed. Thus, such events with negative outcomes can be selected as singleton grouplets, e.g., be grouplets by themselves. For instance, these events are: 4625 (An account failed to log on), 4771 (Kerberos pre-authentication failed), 4772 (Kerberos authentication ticket request failed), 4775 (an account could not be mapped for logon), or 4777 (the domain controller failed to validate credentials for an account).

Secondary choices for seeding/termination events may be defined and utilized. These choices are made when no authentication events are observed before actual key activities start happening in event logs, e.g., the activities related to shared access, processes initiations, user creations, etc. This usually happens when credentials for activity actors are cached or made valid over extended periods of time. Then, the seed/terminate event segments may correspond to events describing initiation/ending of respective activities. For instance, seed events can be 5140 (a network share object was accessed), 4688 (a new process has been created), 4673 (a privileged service was called), 4741 (a computer account was created), or 4720 (a user account was created), etc.

At 302, based on selected events parameters and selected event attributes, events related to the seed events are identified, and at 303, the identified events are assigned to the same event segments as the corresponding seed events. More specifically, event segmentation may be performed on a per user and a per event-reporting machine basis. Two types of indicators can be used for event segmentation: (a) specific event parameters, and (b) specific attributes corresponding to various entities reported in the seed events and the events that follow (in time). Thereby, it can be determined whether newly observed events should be attributed to a specific segment associated with a seed event (or seeded segment).

One type of event attribution is attribution by specific event parameters. Namely, many event types (e.g., event ID 4624 for successful logons, event IDs 4768 and 4769 for Kerberos Tickets, event ID 5140 for access to AD shares, etc.) report a logon ID parameter, which labels events belonging to similar "internal" AD sessions. A segment may comprise many "internal" AD sessions, and all related events get attributed to segments via logon IDs readily seen in the segment.

The second type of attribution involves events that do not have explicit parameters for attribution or parameters (logon IDs) that are not yet attributed to the segment. For such events, attributes of entities in the segment can be tracked. For example, starting from the seed events, events that report similar attributes about specific user and machine identities are identified, such as similar user names, user domains, user security IDs (SIDs), as well as machine names, machine IP addresses, machine domains, machine SIDs, and also service names, service domains, etc. All events having similar attribute values as those already in the segment are assigned to the respective segment.

At 304, event segments are "closed" when no new events are added in a specific/predetermined time interval or when segment-termination events occur.

Figure 4:
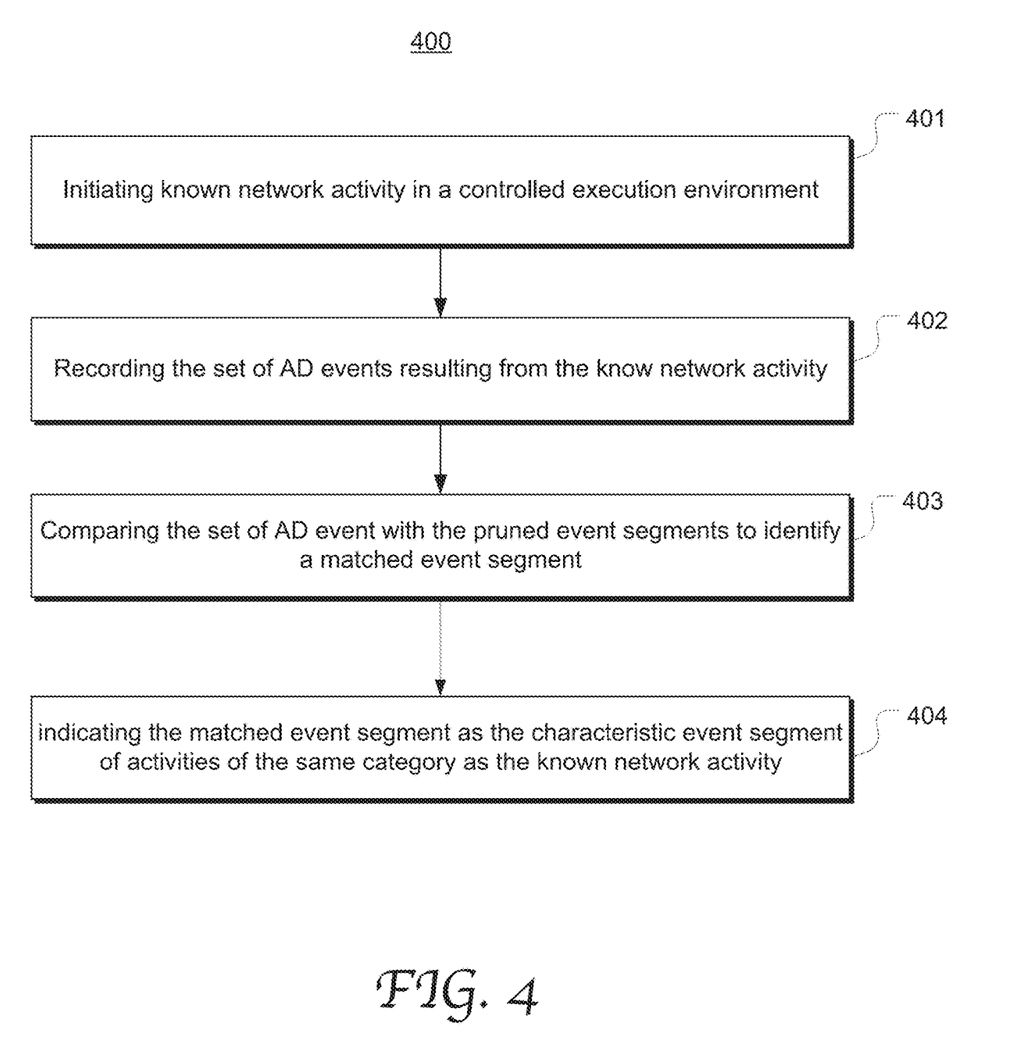
FIG. 4 is a flowchart depicting an exemplary computer-controlled process of associating a category of network activities with a characteristic event segment based on the AD event log data resulting from known activity according to an embodiment of the present disclosure.

FIG. 4 is a flowchart depicting an exemplary computer-controlled process 400 of associating a category of network activities with a characteristic event segment based on the AD event log resulting from a known activity according to an embodiment of the present disclosure. Process 400 may correspond to process 204 in FIG. 2. At 401, the known activity is initiated and executed in a controlled execution environment like 150 in FIG. 1. At 402, the AD events resulting from the known network activity are recorded. At 403, the AD events are compared with the pruned event segments to identify a matched event segment. This can be performed by using a matching algorithm or process. A matched event segment may correspond to a pruned event segment that is most similar with the set of AD events. At 404, the matched event segment is indicated as the characteristic event segment or the grouplet for activities of the same category as the know network activity.

Figure 5:
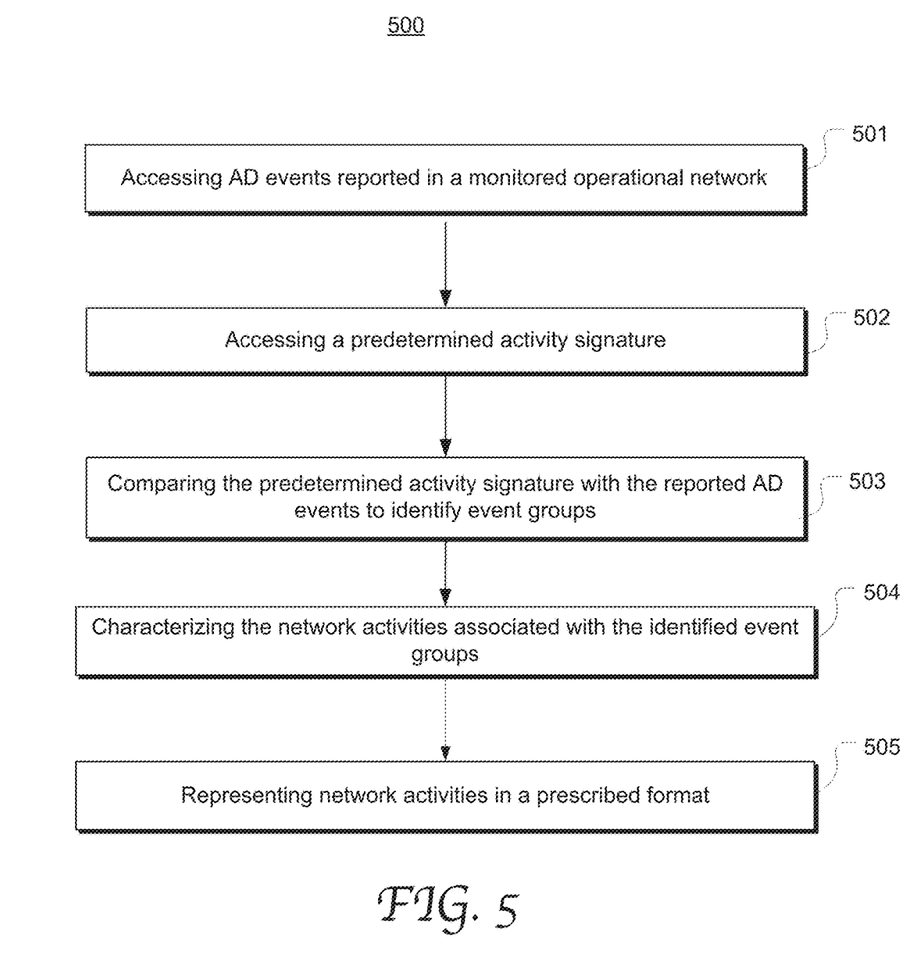
FIG. 5 is a flowchart depicting an exemplary computer-controlled process of applying a predetermined activity signature to analyze AD event log data in a monitored operational network according to an embodiment of the present disclosure.

Once learned, grouplets effectively "behave" like event patterns. As such, they can be easily identified in any AD data sets, either streamed or stored. FIG. 5 is a flowchart depicting an exemplary computer-controlled process 500 of applying a predetermined activity signature to analyze an AD event log in a monitored operational network according to an embodiment of the present disclosure. The monitored operational network can be any AD domain network independent of the training system used to determine the activity signatures.

At 501, the AD events reported in the monitored operational network are accessed. At 502, the predetermined activity signature is accessed, which may be a grouplet as described above. At 503, the predetermined activity signature is compared with the reported AD events to identify event groups. The identification can be performed via any suitable pattern matching algorithm, many of which are readily available in various software development platforms, such as Apache Flink, or Oracle platforms for instance.

At 504, the network activities associated with the identified event groups are characterized. At 505, event information related to the network activities can be represented in a prescribed format, e.g., that is easily interpretable to a human analyst or an analysis application program.

Thus, grouplets according to the present disclosure can advantageously be used to effectively reveal macro-activities. Representation of event data can be transformed to a level that is understandable to a human analyst. More specifically, each grouplet becomes a "macro event" which may indicate the following: an AD activity captured by that particular grouplet type, an activity timespan (from the first to the last AD event in the grouplet), and activity actors such as source and destination users and machines, their privileges, their attributes, as well as the resources that the activity touched (such as authentication services, file system objects, processes, etc.).

For example, inside a grouplet describing an RDP login at the destination machine, there will be more than 20 disjoint AD events. These events include the events related to remote authentication, events for an initiation of processes that support local authentication, as well as the events related to initiation of user interface (UI) processes that present an authentication console/screen to the user, followed by the events for actual local authentication, followed by the events describing a termination of authentication processes, further followed by the events related to an establishment of a user environment at the destination machine.

Instead of presenting these disparate events, a grouplet would directly point to the actual activity by reporting the following data—Activity: RDP login, Start: 01/01/2017 09:00:00, End: 01/01/2017 09:00:05, Source user: Alice, Source user privileges: Standard, Source machine: Windows7_Alice, Destination user: Bob, Destination user privileges: Administrator, Destination machine: Windows10_Bob, Resources accessed: lass.exe, smss.exe, csrss.exe, winlogon.exe, LogonUI.exe, etc.

Grouplets can also advantageously be used to determine roles of event-reporting machines, e.g., a machine being a source of the activity, or a destination of the activity, or a domain controller having some insight in the activity. This is largely possible because grouplets are specific to vantage points of various event reporting machines, effectively serving as signatures of the machine's roles.

Take, as an example, two grouplets, both describing RDP login activity in which all actors belong to the company's AD domain. However, in this example, one grouplet is learned from a vantage point of a domain controller and the other from a vantage point of a destination machine. The two grouplets are very different. The grouplet corresponding to a vantage point of a domain controller would contain AD events describing Kerberos ticket exchange with a source machine, a Kerberos ticket exchange with a destination machine, a remote authentication of a destination user for a destination machine, as well as accesses to "lsarpc" and "samr" resources of domain's IPC share, followed by multiple repetition of a remote authentication of a domain user at a destination machine.

Instead, as mentioned before, a grouplet corresponding to a vantage point of a destination machine would contain events related to remote authentication, events for initiation of processes that support local authentication, as well as the events related to initiation of UI processes that present an authentication console/screen to the user, followed by the events for actual local authentication, followed by the events describing termination of authentication processes, further followed by the events related to an establishment of a user environment at the destination machine. Therefore, if either of the two grouplets is spotted, it can be easily determined whether they were collected at a destination or a domain controller.

In addition, grouplets can advantageously be used to resolve or alleviate blind spots by revealing identities of all/most actors participating in respective AD activities. Taking an example of a grouplet representing RDP login activity from a vantage point of a domain controller. By current state-of-the-art, security analysts would predominantly analyze event IDs 4624, e.g., the events denoting successful logins. However, these events would only report identities of a destination user and a destination machine to the domain controller. On the other hand, the grouplet would contain other events, such as events related to Kerberos ticket exchange which would additionally reveal the identity of a source machine.

In addition, grouplets can advantageously be used to inform machines of exact activities happening at other machines. There are two aspects to this. First, grouplet learning is designed to be representative of specific AD activities, which gives insight to determine the exact activity that happened. Also, without grouplets, individual events would not be informative enough to make such identification. Going back to the example of RDP logins from a vantage point of a domain controller, individual events would look very generic, e.g., Kerberos tickets are exchanged in many other activities, IPC share is accessed in many remote operations, etc. However, occurring together in an order indicated by a grouplet, these events unmistakably point to RDP login activity.

Second, grouplets reveal all/most activity actors. Thus continuing with the previous examples, a domain controller would know at which machine the activity happened and at which machine it was initiated. Thus, combining these two aspects, a domain controller becomes fully aware of activities at remote machines, which would otherwise be impossible via indications of individual events.

Figure 6:
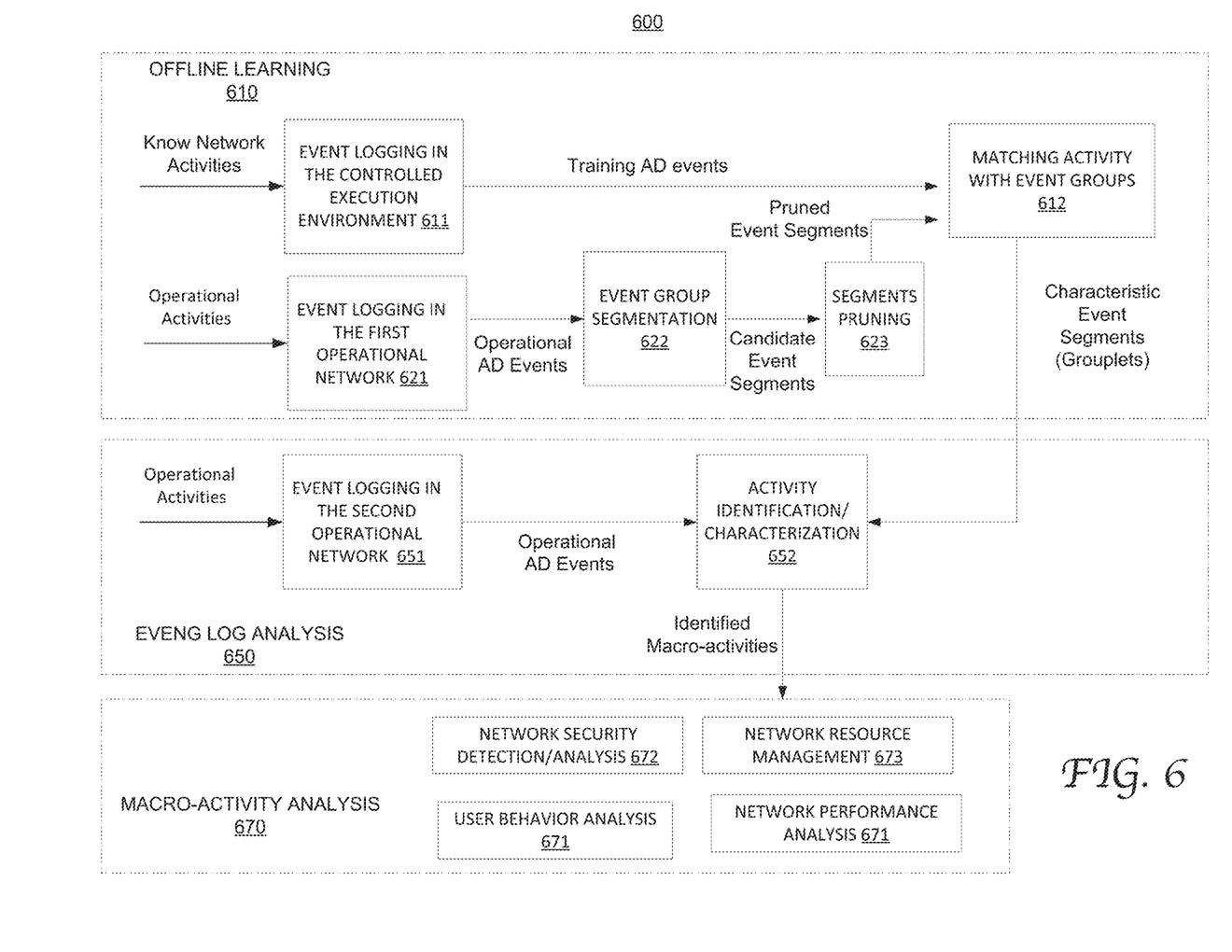
FIG. 6 illustrates the exemplary processes and data flow of generating activity signatures and applying them for data analysis according to an embodiment of the present disclosure.

FIG. 6 illustrates the exemplary processes and data flow of determining characteristic event segments, applying them to identify macro-activates 650, and analyzing the identified macro-activities 670 according to an embodiment of the present disclosure. Characteristic event segments are determined through the offline learning process 610. Through the AD event logging process at 621, operational activities on the first operational network are reported and recorded to produce a collection of operational AD events. Through the event group segmentation process at 622, this collection of AD events are segmented into candidate event segments which are subject to pruning at 623.

In the offline learning process at 610, known activates are executed in a controlled execution platform, which are also reported and recorded as AD events through event logging 611. The AD events of the known activities and the pruned event segments are compared at 612, to match the pruned event segments with the known activities. As a result, the offline process 610 can output characteristic event segments that represent respective activity categories.

The characteristic event segments, once determined, can be used to analyze an AD event log of any operational network, e.g., one that is independent of the first operational network. As illustrated, in the event log analysis process 650 on the second operational network, operational network activities are reported and recorded at 651 as AD events. These AD events and the characteristic event segments are compared at 652 to identify and characterize the macro activities on the second operational network.

Once identified, the macro activities may be subject to further processing and analysis at 670, such as user behavior analysis 671, network security detection/analysis 672, network resource management 673, network performance analysis 673, etc. It will be appreciated that the present disclosure is not limited to any specific process or type of activity analysis or any purposes of such activity analysis.

FIG. 7 illustrates exemplary commonality and difference between the event sequence 720 resulting from a known activity and a corresponding candidate event segment 710 according to an embodiment of the present disclosure. Each solid circle represents an AD event. In this example, both 710 and 720 include the sequence of events C-H that occurred in the same time order; both 710 and 720 also include events K, M, L, I and J but in different time orders.

The candidate event segment 710 additionally has some events X, Y, U and Z caused by noise and sub-activities, which are not present in the event sequence 750. Likewise, the events A and B related to authentication in the known activity are not present in the candidate event segment 710, for example because the activity in the operational network was executed under a valid credential that was authenticated in a previous session. The event sequence 720 also includes other miscellaneous events (e.g., T, V, W) that are absent from the candidate event segment.

Figure 8:
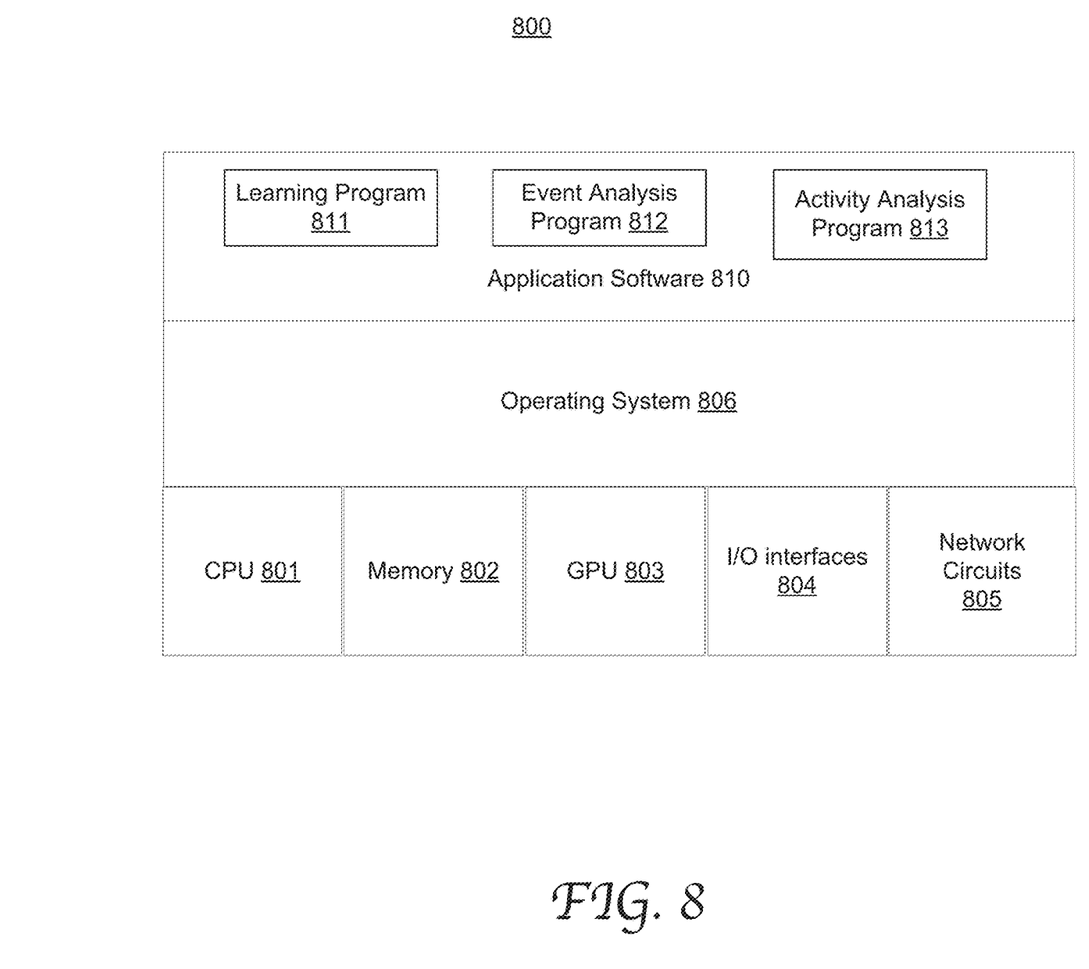
FIG. 8 is an exemplary computing system platform that can be configured to perform offline learning, event log analysis or user behavior analysis according to an embodiment of the present disclosure.

FIG. 8 is a block diagram illustrating an exemplary computing system 800 that can be configured as a platform to perform offline learning, event log analysis or macro activity analysis according to an embodiment of the present disclosure. The computing system may be a general purposes computing system and may comprise a processor 801, a system memory 802, a GPU 803, I/O interfaces 804 and network circuits 805, an operating system 806, and application software 810.

The application software includes a learning program 811 stored in the memory 802. When incorporating the user configurations and training dataset and executed by the CPU 801, the learning program 811 can automatically generate activity signatures (grouplets for example) in accordance with embodiments of the present disclosure, as described in greater detail above, especially with reference to FIGS. 1-4 and 6-7. In some embodiments, the learning program 811 may include instructions to cause a controlled execution platform to execute predetermined known activities as well as process the resulting events.

The application software may also include an event analysis program 812 stored in memory 802. When incorporating predetermined activity signatures and event log data from an operational network as well as user configurations, the event analysis program 812 can automatically identify and characterize activities related to the event log data in accordance with an embodiment of the present disclosure, as described in greater detail above, especially with reference to FIGS. 5 and 6.

The application software may also include an activity analysis program 813 stored in memory 802. When incorporating the identified activities in a specific representation form, the activity analysis program 812 can automatically perform analysis on network security, network performance, network resource management, user behaviors, and etc., in accordance with an embodiment of the present disclosure, as described in greater detail above, especially with reference to FIG. 6.

As will be appreciated by those with ordinary skill in the art, the learning program 811, the event analysis program 812, and activity analysis program 813 can be implemented in any of one or more suitable programming languages that are known to those skilled in the art, such as C, C++, Java, Python, Perl, C#, SQL, etc. The programs 811-813 may also perform a wide range of other functions and processes that are well known in the art.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of processing directory service (DS) log data, the method comprising:
   segmenting a collection of DS events associated with network activities into a plurality of candidate event segments, the plurality of candidate event segments including a first candidate event segment comprising a plurality of DS events of the collection of DS events;
   identifying a set of common events comprising a set of events that the first candidate event segment and a second candidate event segment of the candidate event segments have in common;
   removing, from the plurality of DS events, one or more events that are (i) included in the first candidate event segment, and (ii) not in the set of common events, to produce a pruned first candidate event segment;
   including the pruned first candidate event segment in a set of pruned event segments;
   identifying a matching event segment from among the set of pruned event segments that matches a first set of DS events associated with a network activity; and
   assigning the matching event segment as an activity signature representative of the network activity, wherein the activity signature comprises one or more DS events and is representative of activities in DS domains.

2. The method of claim 1, further comprising:
   selecting seed events from the collection of DS events for the network activity, wherein the seed events are indicators of separation between a first network activity and a second network activity of the network activities;
   identifying DS events from the collection of DS events that are related to the seed events; and
   assigning DS events identified from said identifying DS events related to the seed events to a same candidate event segment as the seed events.

3. The method of claim 1, further comprising:
   accessing DS events reported by a network;
   comparing the activity signature and the DS events reported by the network, to identify groups of the DS events reported by the network; and
   determining the network activities associated with the groups.

4. The method of claim 1, further comprising:
   executing known network activities in a controlled execution platform;
   recording DS events associated with the known network activities; and
   comparing the DS events associated with the known network activities and the pruned event segments to determine activity signatures for respective categories of the known network activities.

5. The method of claim 1, wherein the collection of DS events and the first set of DS events comprise Active Directory (AD) events, and wherein the DS events comprise events that are identified as events using a respective event identifier (ID).

6. The method of claim 1, wherein the first set of DS events comprises common events identified as common among the first candidate event segment and a second candidate event segment and events related to an authentication process.

7. The method of claim 1, wherein identifying the matching event segment further comprises using a matching process to determine similarities between the first set of DS events and the set of pruned event segments.

8. A non-transitory computer-readable storage medium embodying instructions that, when executed by a processing device, cause the processing device to perform a method of processing directory service (DS) log data, the method comprising:
   segmenting a collection of DS events associated with network activities into a plurality of candidate event segments, the plurality of candidate event segments including a first candidate event segment comprising a plurality of DS events of the collection of DS events;
   identifying a set of common events comprising a set of events that the first candidate event segment and a second candidate event segment of the candidate event segments have in common;
   removing, from the plurality of DS events, one or more events that are (i) included in the first candidate event segment, and (ii) not in the set of common events, to produce a pruned first candidate event segment;
   including the pruned first candidate event segment in a set of pruned event segments;
   identifying a matching event segment from among the set of pruned event segments that matches a first set of DS events associated with a network activity; and
   assigning the matching event segment as an activity signature representative of the network activity, wherein the activity signature comprises one or more DS events and is representative of activities in DS domains.

9. The non-transitory computer-readable storage medium of claim 8, wherein the method further comprises:

selecting seed events from the collection of DS events for the network activity, wherein the seed events are indicators of separation between a first network activity and a second network activity of the network activities;

identifying DS events from the collection of DS events that are related to the seed events; and assigning DS events identified from said identifying DS events related to the seed events to a same candidate event segment as the seed events.

10. The non-transitory computer-readable storage medium of claim 8, wherein the method further comprises:

accessing DS events reported by a network;

comparing the activity signature and the DS events reported by the network, to identify groups of the DS events reported by the network; and determining the network activities associated with the groups.

11. The non-transitory computer-readable storage medium of claim 8, wherein the method further comprises:

executing known network activities in a controlled execution platform;

recording DS events associated with the known network activities; and comparing the DS events associated with the known network activities and the pruned event segments to determine activity signatures for respective categories of the known network activities.

12. The non-transitory computer-readable storage medium of claim 8, wherein the collection of DS events and the first set of DS events comprise Active Directory (AD) events, and wherein the DS events comprise events that are identified as events using a respective event identifier (ID).

13. The non-transitory computer-readable storage medium of claim 8, wherein the first set of DS events comprises common events identified as common among the first candidate event segment and a second candidate event segment and events related to an authentication process.

14. The non-transitory computer-readable storage medium of claim 8, wherein identifying the matching event segment further comprises using a matching process to determine similarities between the first set of DS events and the set of pruned event segments.

15. A system, comprising:

a processor; and memory coupled to the processor and comprising instructions that, when executed by the processor, cause the system to perform a method of processing data, the method comprising:

segmenting a collection of DS events associated with network activities into a plurality of candidate event segments, the plurality of candidate event segments including a first candidate event segment comprising a plurality of DS events of the collection of DS events;

identifying a set of common events comprising a set of events that the first candidate event segment and a second candidate event segment of the candidate event segments have in common;

removing, from the plurality of DS events, one or more events that are (i) included in the first candidate event segment, and (ii) not in the set of common events, to produce a pruned first candidate event segment;

including the pruned first candidate event segment in a set of pruned event segments;

identifying a matching event segment from among the set of pruned event segments that matches a first set of DS events associated with a network activity; and assigning the matching event segment as an activity signature representative of the network activity, wherein the activity signature comprises one or more DS events and is representative of activities in DS domains.

16. The system of claim 15, wherein the method further comprises:

selecting seed events from the collection of DS events for the network activity, wherein the seed events are indicators of separation between a first network activity and a second network activity of the network activities;

identifying DS events from the collection of DS events that are related to the seed events; and assigning DS events identified from said identifying DS events related to the seed events to a same candidate event segment as the seed events.

17. The system of claim 15, wherein the method further comprises:

accessing DS events reported by a network;

comparing the activity signature and the DS events reported by the network, to identify groups of the DS events reported by the network; and determining the network activities associated with the groups.

18. The system of claim 15, wherein the method further comprises:

executing known network activities in a controlled execution platform;

recording DS events associated with the known network activities; and comparing the DS events associated with the known network activities and the pruned event segments, to determine activity signatures for respective categories of the known network activities.

19. The system of claim 15, wherein the collection of DS events and the first set of DS events comprise Active Directory (AD) events, and wherein the DS events comprise events that are identified as events using a respective event identifier (ID).

20. The system of claim 15, wherein the first set of DS events comprises common events identified as common among the first candidate event segment and a second candidate event segment and events related to an authentication process.

* * * * *